(12) United States Patent
Liang et al.

(10) Patent No.: US 8,804,345 B2
(45) Date of Patent: Aug. 12, 2014

(54) INTEGRATED APPLIANCE

(75) Inventors: Shuozhen Liang, Shenzhen (CN);
Yu-Chun Hsiao, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 8 days.

(21) Appl. No.: 13/375,485

(22) PCT Filed: Jul. 18, 2011

(86) PCT No.: PCT/CN2011/077244
§ 371 (c)(1),
(2), (4) Date: Nov. 30, 2011

(87) PCT Pub. No.: WO2013/004027
PCT Pub. Date: Jan. 10, 2013

(65) Prior Publication Data
US 2013/0010433 A1    Jan. 10, 2013

(51) Int. Cl.
*H05K 1/00* (2006.01)
(52) U.S. Cl.
USPC ............ 361/748; 361/720; 361/719; 361/722
(58) Field of Classification Search
USPC .................................. 361/748, 720, 719, 722
See application file for complete search history.

(56) References Cited

U.S. PATENT DOCUMENTS

2005/0124221 A1* 6/2005 Lin ............................... 439/620

FOREIGN PATENT DOCUMENTS

CN        201527518 U       7/2010

* cited by examiner

*Primary Examiner* — Andargie M Aychillhum
(74) *Attorney, Agent, or Firm* — Cheng-Ju Chiang

(57) ABSTRACT

An integrated appliance is disclosed in the present disclosure. The integrated appliance comprises a backplate and a circuit board. The circuit board comprises a baseplate and an electronic component disposed on the baseplate. The baseplate is fixed to an inner wall of the backplate, and the electronic component is located between the baseplate and the backplate. With the aforesaid arrangement, an uneven surface structure of the backplate itself is utilized in the integrated appliance of the present disclosure to dispose the circuit board on the inner wall of the backplate in such a way that the electronic component on the circuit board is disposed facing towards an inner wall surface of the backplate. As this eliminates the use of the back cover, the structure is simplified and both the mold cost and the material cost associated with the back cover are saved, thus resulting in a reduced manufacturing cost.

9 Claims, 10 Drawing Sheets

INTEGRATED APPLIANCE

FIELD OF THE INVENTION

The present disclosure generally relates to the technical field of electric appliances, and more particularly, to an integrated appliance.

BACKGROUND OF THE INVENTION

With continuous advancement of the science and technology, electric appliances such as TV sets and computers can now be designed in an integrated form. Referring to FIG. 1, there is shown a schematic partial cross-sectional view of a prior art integrated appliance. The prior art integrated appliance comprises a backplate 110, a circuit board 120 and a back cover 130. The backplate 110 is formed with a plurality of protrusions 111 for securing the circuit board 120 to the backplate 110.

The circuit board 120 is fixed to the backplate 110, and electronic components 122 on the circuit board 120 are disposed on a surface of the circuit board 120 that faces away from the backplate 110 but towards the back cover 130.

The back cover 130 has two ends thereof connected to two ends of the backplate 110 respectively, and cooperates with the backplate 110 to form a closed receiving space for protecting the circuit board 120.

In the prior art integrated appliance, the back cover 130 plays an essential role because, if the circuit board 120 is not covered by the back cover 130, the electronic components 122 on the circuit board 120 would be exposed outside directly to increase the probability that the components or circuits on the circuit board 120 are damaged. For instance, the probability that the electronic components 122 on the circuit board 120 are exposed to impacting or to a liquid would be increased if the circuit board 120 is not covered by the back cover 130. Moreover, having the circuit board 120 exposed outside during operation of the integrated appliance would also put the user under the risk of getting an electric shock. However, because manufacturing of the back cover 130 requires use of a mold, the manufacturing cost is increased by at least the mold cost and the material cost of the back cover.

Accordingly, an urgent need exists in the art to provide an integrated appliance having a reduced manufacturing cost.

SUMMARY OF THE INVENTION

A primary objective of the present disclosure is to provide an integrated appliance that can eliminate the use of a back cover to simplify the structure and to reduce the manufacturing cost.

To achieve this objective, an embodiment of the present disclosure provides an integrated appliance. The integrated appliance comprises a backplate and a circuit board. The backplate is provided with a riveting stud. The riveting stud comprises a rivet cap and a stem connected with the rivet cap. The stem is passed through the backplate with the rivet cap abutting against an outer surface of the backplate. The circuit board comprises a baseplate and an electronic component disposed on the baseplate. The baseplate is fixed to an end of the stem that is away from the riveting cap, and the electronic component faces towards an inner wall of the backplate and is located in a first receiving space formed by the riveting stud and the baseplate.

According to a preferred embodiment of the present disclosure, the riveting stud is fixedly connected to the baseplate by means of a screw.

According to a preferred embodiment of the present disclosure, the backplate is provided with interfacing through-holes, the circuit board is provided with interfacing ports, and each of the interfacing ports has an end thereof connected to the baseplate and the other end thereof passed through one of the interfacing through-holes.

According to a preferred embodiment of the present disclosure, the integrated appliance further comprises a reflective sheet, at least one end of the reflective sheet is fixedly connected to the inner wall of the backplate, and the circuit board is disposed in a second receiving space formed by the reflective sheet and the backplate.

According to a preferred embodiment of the present disclosure, the integrated appliance further comprises a support structure disposed in the second receiving space, and the support structure has a first end connected to the reflective sheet and a second end connected to the inner wall of the backplate.

To achieve the aforesaid objective, an embodiment of the present disclosure provides an integrated appliance. The integrated appliance comprises a backplate and a circuit board. The circuit board comprises a baseplate and an electronic component disposed on the baseplate. The baseplate is fixed to an inner wall of the backplate, and the electronic component is located between the baseplate and the backplate.

According to a preferred embodiment of the present disclosure, the backplate is provided with a protruding portion, and the electronic component faces the inner wall and is located in a first receiving space formed by the protruding portion and the baseplate.

According to a preferred embodiment of the present disclosure, a plurality of first concave portions are disposed at intervals in the protruding portion, and the baseplate is fixed to the first concave portions.

According to a preferred embodiment of the present disclosure, the first concave portions are fixedly connected to the baseplate by means of screws.

According to a preferred embodiment of the present disclosure, the protruding portion is further provided with second concave portions each having an interfacing through-hole formed therein, the circuit board is provided with interfacing ports, and each of the interfacing ports has an end thereof connected to the baseplate and the other end thereof passed through one of the interfacing through-holes.

According to a preferred embodiment of the present disclosure, the integrated appliance further comprises a reflective sheet, at least one end of the reflective sheet is fixedly connected to the inner wall of the backplate, and the circuit board is disposed in a second receiving space formed by the reflective sheet and the backplate.

According to a preferred embodiment of the present disclosure, the integrated appliance further comprises a support structure disposed in the second receiving space, and the support structure has a first end connected to the reflective sheet and a second end connected to the inner wall of the backplate.

According to a preferred embodiment of the present disclosure, the second end of the support structure is connected to an inner surface of the protruding portion of the backplate.

To achieve the aforesaid objective, an embodiment of the present disclosure provides an integrated appliance. The integrated appliance comprises a backplate and a circuit board. The circuit board comprises a baseplate and an electronic component disposed on the baseplate. The baseplate is fixed to an inner wall of the backplate and the electronic component is located between the baseplate and the backplate. A plurality of concave portions are formed at intervals on the inner wall, and the baseplate is fixed to the concave portions by means of screws.

According to a preferred embodiment of the present disclosure, the electronic component faces towards the inner wall and is located in a first receiving space formed by the inner wall and the baseplate.

According to a preferred embodiment of the present disclosure, the backplate is provided with interfacing through-holes, the circuit board is provided with interfacing ports, and each of the interfacing ports has an end thereof connected to the baseplate and the other end thereof passed through one of the interfacing through-holes.

According to a preferred embodiment of the present disclosure, the integrated appliance further comprises a reflective sheet, wherein at least one end of the reflective sheet is fixedly connected to the inner wall of the backplate, and the circuit board is disposed in a second receiving space formed by the reflective sheet and the backplate.

According to a preferred embodiment of the present disclosure, the integrated appliance further comprises a support structure disposed in the second receiving space, and the support structure has a first end connected to the reflective sheet and a second end connected to the inner wall of the backplate.

The present disclosure has the following benefits: as compared to the prior art, an uneven surface structure of the backplate itself is utilized in the integrated appliance of the present disclosure to dispose the circuit board on the inner wall of the backplate in such a way that the electronic component on the circuit board is disposed facing towards an inner wall surface of the backplate. As this eliminates the use of the back cover, the structure is simplified and both the mold cost and the material cost associated with the back cover are saved, thus resulting in a reduced manufacturing cost.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF THE INVENTION

The present disclosure is more particularly described in the following examples that are intended as illustrative only since numerous modifications and variations therein will be apparent to those skilled in the art.

Figure 1:
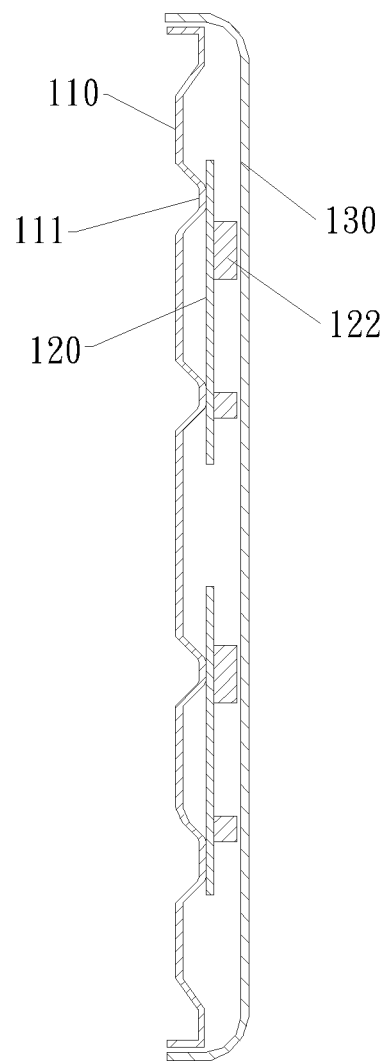
FIG. 1 is a schematic partial cross-sectional view of a prior art integrated appliance.
Figure 2:
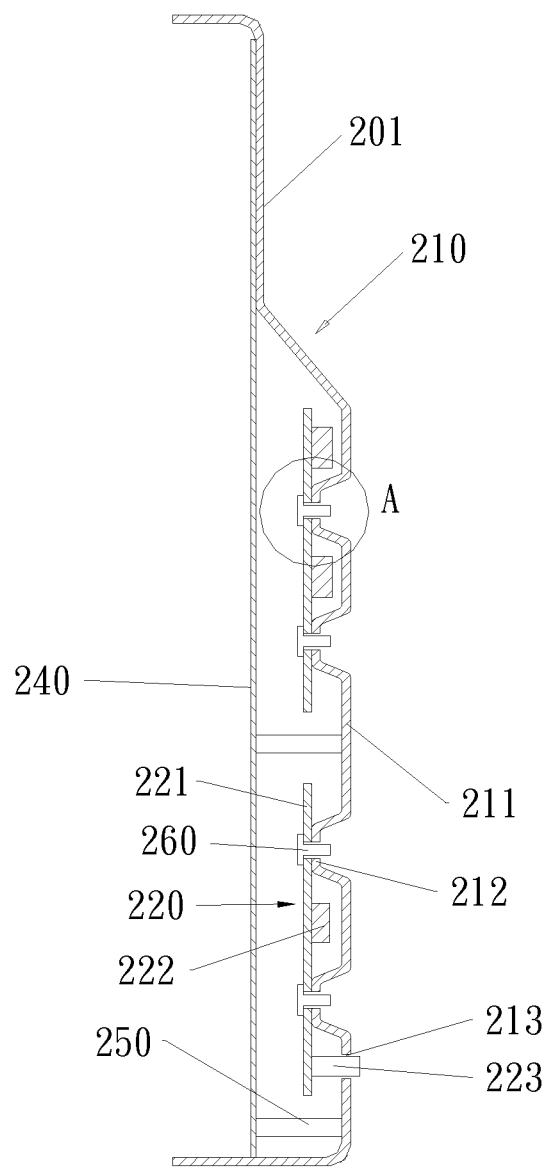
FIG. 2 is a cross-sectional view illustrating the back of an integrated appliance according to a first embodiment of the present disclosure.
Figure 3:
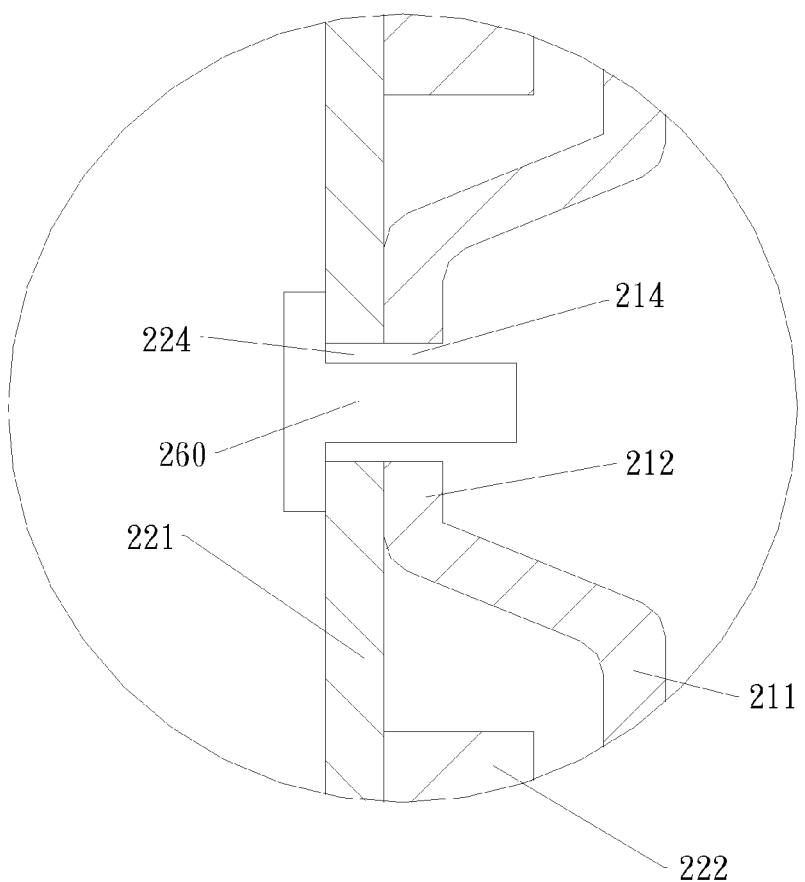
FIG. 3 is an enlarged view of an area A shown in FIG. 2.

FIG. 2 is a cross-sectional view illustrating the back of an integrated appliance according to a first embodiment of the present disclosure, and FIG. 3 is an enlarged view of an area A shown in FIG. 2.

Referring to FIG. 2, the integrated appliance according to the first embodiment of the present disclosure comprises a backplate 210, a circuit board 220 and a reflective sheet 240.

The backplate 210 comprises an end portion 201 and a protruding portion 211 that protrudes in a direction towards an outer surface of the backplate 210 relative to the end portion 201. The surface of the protruding portion 211 is formed with a plurality of concave portions 212 at intervals therein, and the concave portions 212 are concave from the outer surface of the backplate 210 towards an inner wall of the backplate 210.

The circuit board 220 comprises a backplate 221 and an electronic component 222. The electronic component 222 is disposed on the baseplate 221 which is, in turn, fixed on the inner wall of the backplate 210. Specifically, the baseplate 221 is fixed to the concave portions 212 of the backplate 210.

As shown in FIG. 3, in this embodiment, the baseplate 221 has a first through-hole 224, and a second through-hole 214 is formed correspondingly in a corresponding concave portion 212. The integrated appliance further comprises a screw 260 inserted through the first through-hole 224 and the second through-hole 214 to fixedly connect the baseplate 221 to the concave portion 212. The electronic component 222 is located between the baseplate 221 and the backplate 210, and specifically, is located in a first receiving space formed by the protruding portion 211 and the baseplate 221.

Referring back to FIG. 2, the circuit board 220 is provided with interfacing ports 223, and interfacing through-holes 213 are formed in the backplate 210 at positions corresponding to the interfacing ports 223 of the circuit board 220. The interfacing through-holes 213 are adapted to accommodate the interfacing ports 223 of the circuit board 220 respectively. In detail, each of the interfacing ports 223 has an end thereof connected to the baseplate 221 and the other end thereof passed through the interfacing through-hole 213. Each of the interfacing ports 223 is used to connect with an external device, and may be, for example, an I/O interface, a USB interface, an HDMI interface, an audio interface, a video interface, a DVI interface or the like. The backplate 210 may form various forms of interfacing through-holes 213 to accommodate interfacing ports 223 in various forms and sizes. Generally, each of the interfacing through-holes 213 is of a circular form, a rectangular form or a trapezoidal form.

The reflective sheet 240 has at least one end thereof fixedly connected to the inner wall of the backplate 210. Specifically, in this embodiment, the reflective sheet 240 has an end thereof fixedly connected to the inner wall of the end portion 201 of the backplate 210, and has the other end thereof abut against a sidewall (not labeled) of the backplate 210. Specifically, the circuit board 220 is disposed in a second receiving space formed by the reflective sheet 240 and the backplate 210. In this embodiment, the integrated appliance further comprises a support structure 250 disposed in the second receiving space to support the reflective sheet 240 so that the reflective sheet 240 will not make contact with the circuit board 220. Specifically, the support structure 250 has a first end thereof connected to the reflective sheet 240, and has a second end thereof connected to an inner wall of the backplate 210 and, preferably, to an inner surface of the protruding portion 211 of the backplate 210.

Figure 4:
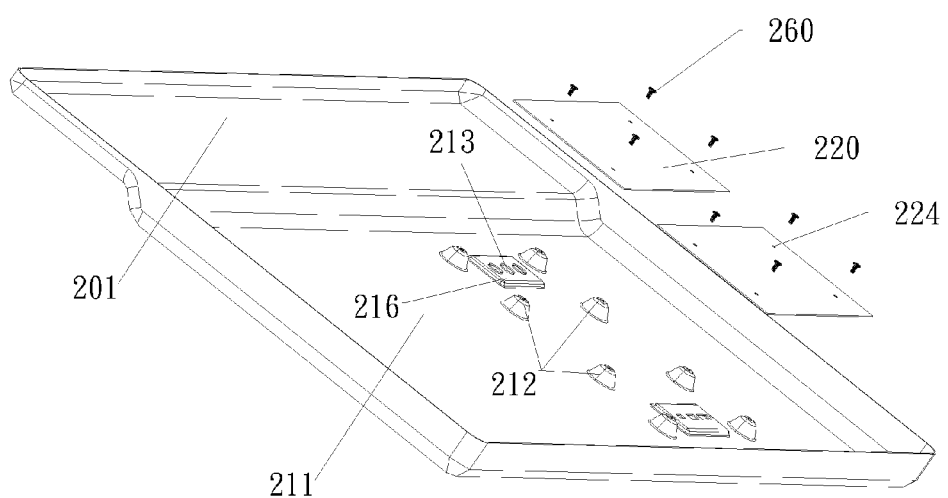
FIG. 4 is an exploded view illustrating the back of the integrated appliance according to the first embodiment of the present disclosure.
Figure 5:
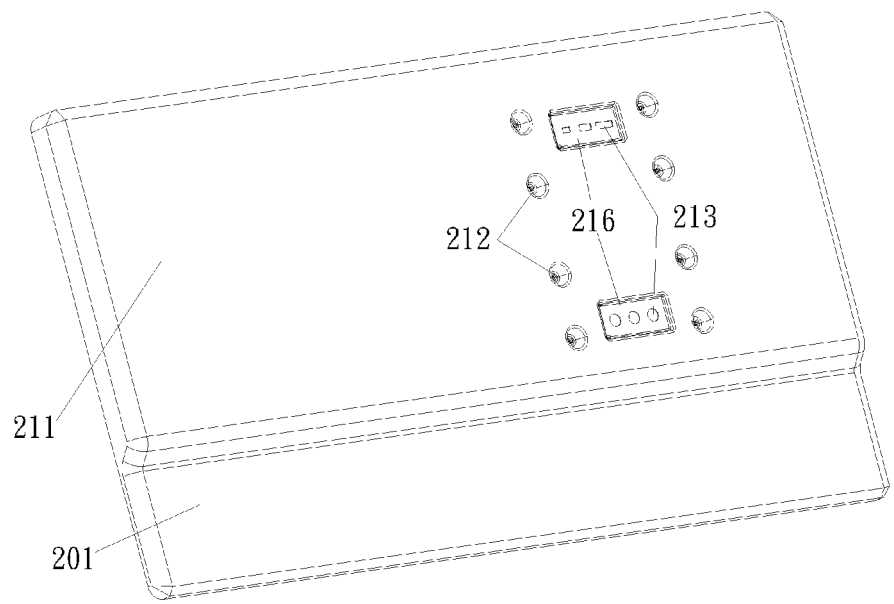
FIG. 5 is a schematic perspective view illustrating the back of the integrated appliance shown in FIG. 4.

Referring to FIGS. 4 and 5, FIG. 4 is an exploded view illustrating the back of the integrated appliance according to the first embodiment of the present disclosure, and FIG. 5 is a schematic perspective view illustrating the back of the integrated appliance shown in FIG. 4. The concave portions 212 are disposed at intervals in the protruding portion 211, and second concave portions 216 are further formed in the protruding portion 211. The interfacing through-holes 213 are just formed in the second concave portions 216. The circuit board 220 is fixed in suspension by inserting the screws 260 through the first through-holes 224 formed in the circuit board and the second through-holes 214 formed in the concave portions 212.

The integrated appliance of this embodiment can eliminate the use of a back cover to simplify the structure and save the manufacturing cost. Moreover, the protruding portion and the concave portions are generally formed as features of the backplate itself without having to be manufactured separately. Even when the protruding portion and the concave portions are manufactured separately, only very slight modifications shall be made without consuming much labor and time.

Figure 6:
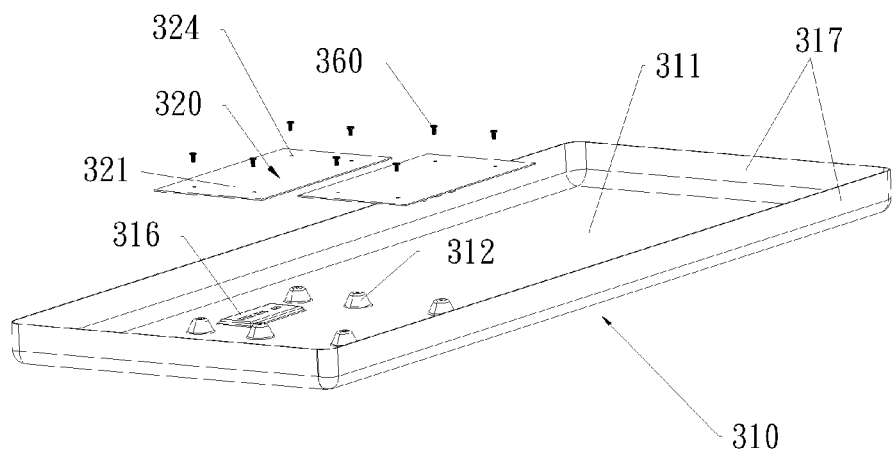
FIG. 6 is an exploded view illustrating the back of an integrated appliance according to a second embodiment of the present disclosure.
Figure 7:
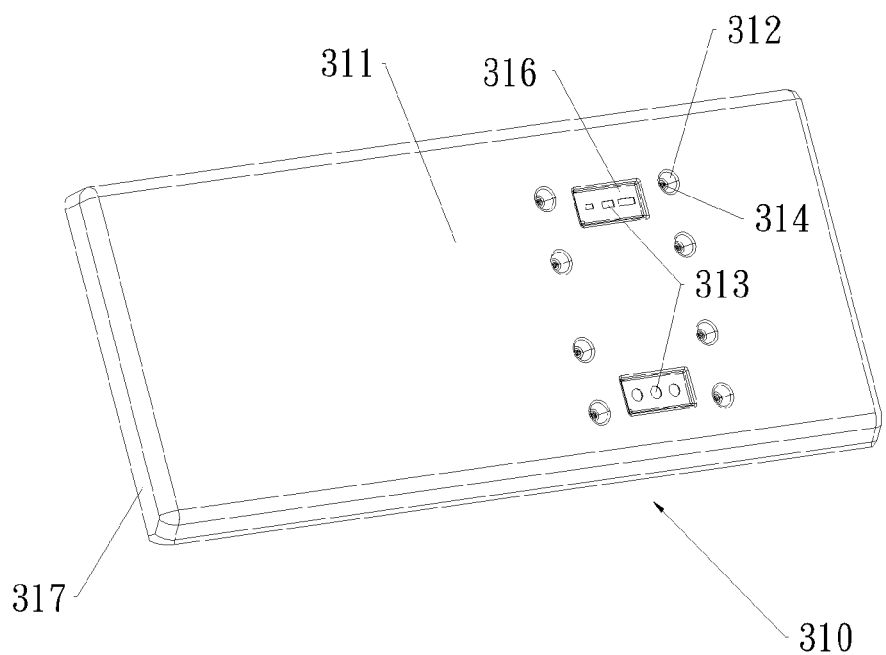
FIG. 7 is a schematic perspective view illustrating the back of the integrated appliance shown in FIG. 6.

Referring to FIGS. 6 and 7, FIG. 6 is an exploded view illustrating the back of an integrated appliance according to a second embodiment of the present disclosure, and FIG. 7 is a view illustrating the back of the integrated appliance shown in FIG. 6. The integrated appliance according to the second embodiment of the present disclosure comprises a backplate 310 and circuit boards 320.

The backplate 310 comprises a backplate body 311 and sidewalls 317 disposed around the backplate body 311 and extending towards a same side of the backplate body 311. First concave portions 312 and second concave portions 316 are formed on the backplate body 311.

The circuit board 320 comprises a baseplate 321 and an electronic component (not shown) disposed on the baseplate 321. The baseplate 321 is fixed to the inner wall of the backplate 310, and specifically, on bottom surfaces of the first concave portions 312. First through-holes 324 are formed in the baseplate 321, and second through-holes 314 are formed in the first concave portions 312. The integrated appliance further comprises screws 360 which are adapted to be inserted through the first through-holes 324 and the second through-holes 314 to fixedly connect the baseplate 321 to the first concave portions 312. The electronic component faces towards an inner wall surface of the backplate body 311 and is located between the backplate 321 and the backplate body 311.

Each of the second concave portions 316 is formed with an interfacing through-hole 313, and the circuit board 320 is formed with interfacing ports (not shown). Each of the interfacing ports has an end thereof connected to the baseplate 321, and has the other end thereof passed through one of the interfacing through-holes 313. The interfacing ports are adapted to interface with external devices respectively, and have been described in detail in the previous embodiment, so they will not be further described herein.

As can be seen, the integrated appliance of this embodiment can eliminate the use of a back cover to simplify the structure and save the manufacturing cost.

Figure 8:
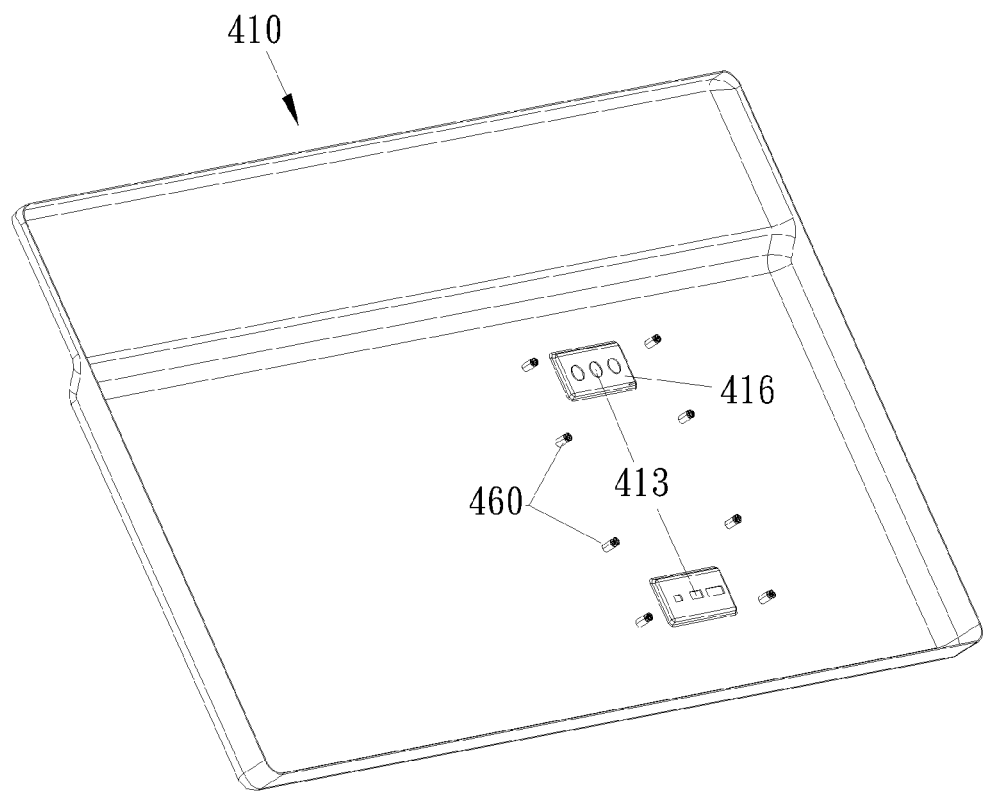
FIG. 8 is a schematic inside view illustrating the back of an integrated appliance according to a third embodiment of the present disclosure.
Figure 9:
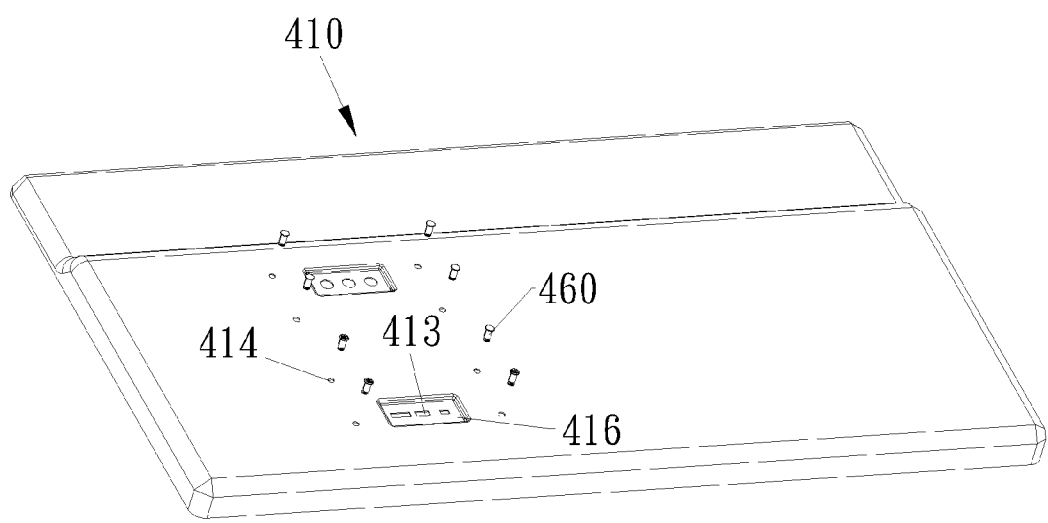
FIG. 9 is an exploded view illustrating the back of the integrated appliance according to the third embodiment of the present disclosure.

Referring to FIGS. 8 and 9, FIG. 8 is a schematic inside view illustrating the back of an integrated appliance according to a third embodiment of the present disclosure, and FIG. 9 is an exploded view illustrating the back of the third embodiment of the integrated appliance according to the present disclosure. In the third embodiment, the integrated appliance comprises a backplate 410 and a circuit board (not shown).

Figure 10:
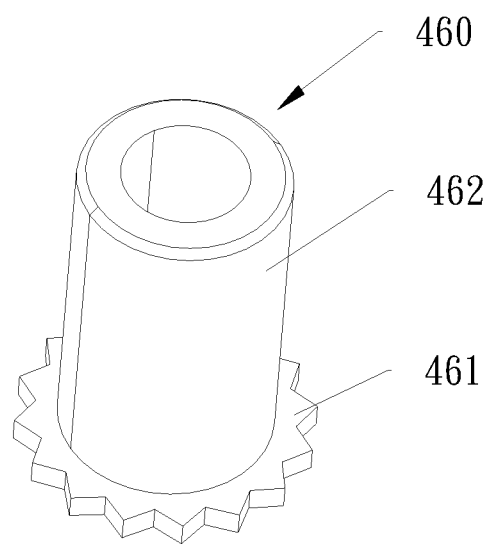
FIG. 10 is a schematic view of a riveting stud in the integrated appliance according to the third embodiment of the present disclosure.

The backplate 410 is formed with a plurality of through-holes 414 thereon. The integrated appliance further comprises riveting studs 460 that are passed through the through-holes 414 to fix the circuit board in suspension. Referring to FIG. 10, there is shown a schematic view of a riveting stud in the integrated appliance according to the third embodiment of the present disclosure. The riveting stud 460 comprises a rivet cap 461 and a stem 462, and the rivet cap 461 abuts against an outer surface (i.e., a surface that is away from the circuit board) of the backplate 410. As described above, the circuit board (not shown) comprises a baseplate and an electronic component fixed on the baseplate. The stem 462 of the riveting stud 460 passes through a corresponding through-hole 414, and the circuit board is fixed to an end of the stem 462 that is away from the rivet cap 461. Then, through engagement of a screw (not shown) with the stem 462 of the riveting stud 460, a fixed connection with the baseplate of the circuit board can be accomplished.

As described above, the circuit board is supported in suspension by the stem 462 so that a receiving space is formed between the baseplate of the circuit board and the inner wall of the backplate 410, and the electronic component on the circuit board is just located in this receiving space. The backplate 410 is further formed with concave portions 416, each of which has an interfacing through-hole 413 formed therein. The circuit board is provided with interfacing ports (not shown) thereon. Each of the interfacing ports has an end thereof connected to the baseplate, and has the other end thereof passed through a corresponding interfacing through-hole 413. The interfacing ports are adapted to interface with external devices respectively, and have been described in detail in the previous embodiment, so they will not be further described herein.

In the present disclosure, the integrated appliance is a TV set. The integrated appliance of the present disclosure is not merely limited to the three embodiments described above, and modifications in structure of the present disclosure can be made by those skilled in the art based on their experiences without the need of making inventive efforts.

With the aforesaid arrangement, an uneven surface structure of the backplate itself is utilized in the integrated appliance of the present disclosure to dispose the circuit board on the inner wall of the backplate in such a way that the electronic component on the circuit board is disposed facing towards an inner wall surface of the backplate. As this eliminates the use of the back cover, the structure is simplified and both the mold cost and the material cost associated with the back cover are saved, thus resulting in a reduced manufacturing cost.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An integrated appliance, comprising: a backplate; and a circuit board, comprising a baseplate and an electronic component disposed on the baseplate, wherein the baseplate is fixed to an inner wall of the backplate, and the electronic component is located between the baseplate and the backplate;

wherein the backplate is provided with a protruding portion, and the electronic component faces towards the inner wall and is located in a first receiving space formed by the protruding portion and the baseplate;

wherein a plurality of first concave portions are disposed at intervals on the inner wall, and the baseplate is fixed to the first concave portions; and wherein the protruding portion is further provided with second concave portions each having an interfacing through-hole formed therein, the circuit board is provided with interfacing ports, and each of the interfacing ports has an end thereof connected to the baseplate and the other end thereof passed through one of the interfacing through-holes.

2. The integrated appliance of claim 1, wherein the first concave portions are fixedly connected to the baseplate by means of screws.

3. The integrated appliance of claim 1, further comprising a reflective sheet, wherein at least one end of the reflective sheet is fixedly connected to the inner wall of the backplate, and the circuit board is disposed in a second receiving space formed by the reflective sheet and the backplate.

4. The integrated appliance of claim 3, further comprising a support structure disposed in the second receiving space, and the support structure has a first end connected to the reflective sheet and a second end connected to the inner wall of the backplate.

5. The integrated appliance of claim 4, wherein the second end of the support structure is connected to an inner surface of the protruding portion of the backplate.

6. An integrated appliance, comprising: a backplate; and a circuit board, comprising a baseplate and an electronic component disposed on the baseplate, wherein the baseplate is fixed to an inner wall of the backplate and the electronic component is located between the baseplate and the backplate; wherein a plurality of concave portions are formed at intervals on the inner wall, and the baseplate is fixed to the concave portions by means of screws;

a reflective sheet, wherein at least one end of the reflective sheet is fixedly connected to the inner wall of the backplate, and the circuit board is disposed in a second receiving space formed by the reflective sheet and the backplate.

7. The integrated appliance of claim 6, wherein the electronic component faces towards the inner wall and is located in a first receiving space formed by the inner wall and the baseplate.

8. The integrated appliance of claim 7, wherein the backplate is provided with interfacing through-holes, the circuit board is provided with interfacing ports, and each of the interfacing ports has an end thereof connected to the baseplate and the other end thereof passed through one of the interfacing through-holes.

9. The integrated appliance of claim 6, further comprising a support structure disposed in the second receiving space, and the support structure has a first end connected to the reflective sheet and a second end connected to the inner wall of the backplate.

* * * * *